W. W. GOFF.
Thill Coupling.

No. 73,317.

Patented Jan. 14, 1868.

Witnesses:

Inventor:

United States Patent Office.

W. W. GOFF, OF, AVOCA, NEW YORK.

Letters Patent No. 73,317, dated January 14, 1868.

IMPROVEMENT IN THILL-COUPLING.

*The Schedule referred to in these Letters Patent and making part of the same.*

TO ALL WHOM IT MAY CONCERN:

Be it known that I, W. W. GOFF, of Avoca, county of Steuben, and State of New York, have invented certain new and useful Improvements in Thill-Couplings; and I do hereby declare that the following is a full, clear, and exact description of the same, reference being had to the accompanying drawings, and to the letters of reference marked thereon, in which—

Figure 1:
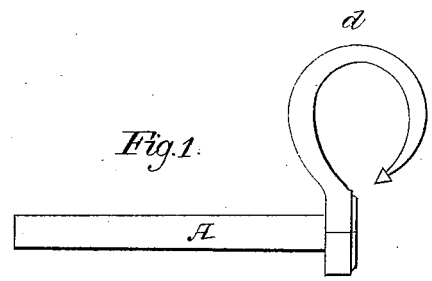
Figure 2:
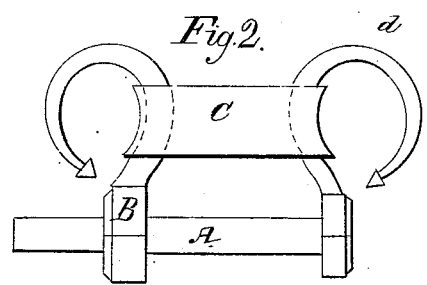

Figure 1 is a side view of the bolt, and
Figure 2 a side view of my device complete.

The nature of this invention consists in the employment of a loose bolt, slide, and India-rubber ring or spring, when used in combination, substantially as and for the purpose specified.

To enable others skilled in the art to make and use my invention, I will now describe the construction thereof.

A represents a bolt, provided at one end with the hook $a$, which should either form a part of the bolt or be securely attached to it. B is a sliding hook, and C a ring of India rubber, which connects the two hooks, as clearly indicated in fig. 2.

By this simple and economical arrangement I dispense with screw and nut, thereby materially lessening the danger of the thills becoming detached from the coupling by the nut working off, which not unfrequently is the cause of both life and limb being sacrificed. It will be seen that my device also effectually prevents the rattling, which is a source of so much annoyance, for the India-rubber ring keeps the parts closely pressed together as they become worn. Another great advantage of this invention is the ease and rapidity with which it can be taken off or readjusted.

Having thus fully described my invention, what I claim, and desire to secure by Letters Patent, is—

The bolt A, sliding hook B, and India-rubber ring or spring, when combined, substantially as and for the purpose set forth.

In testimony that I claim the above as my own, I hereby affix my signature in the presence of two witnesses.

W. W. GOFF.

Witnesses:
    JAS. R. VOORHEES,
    R. H. COLLIER.